No. 714,316. Patented Nov. 25, 1902.
C. T. MEREDITH.
MUSIC CHART.
(Application filed Apr. 18, 1900.)
(No Model.)

WITNESSES
Chas. L. Hyde.
M. C. Nickerson.

INVENTOR
Charles T. Meredith
BY Hazard & Harpham
ATTORNEYS.

UNITED STATES PATENT OFFICE.

CHARLES T. MEREDITH, OF SAN DIEGO, CALIFORNIA.

MUSIC-CHART.

SPECIFICATION forming part of Letters Patent No. 714,316, dated November 25, 1902.

Application filed April 18, 1900. Serial No. 13,379. (No model.)

*To all whom it may concern:*

Be it known that I, CHARLES T. MEREDITH, a citizen of the United States, residing at San Diego, in the county of San Diego, State of California, have invented new and useful Improvements in Music-Charts, of which the following is a specification.

My invention relates to music-charts for teaching the different positions of the gamut in different keys; and the object thereof is to provide a simple device to ocularly demonstrate the different positions in the different keys in which vocal music is written of the gamut with reference to the chromatic scale. I accomplish this object by the chart described herein, and illustrated in the accompanying drawings, forming a part hereof, in which—

Figure 1:
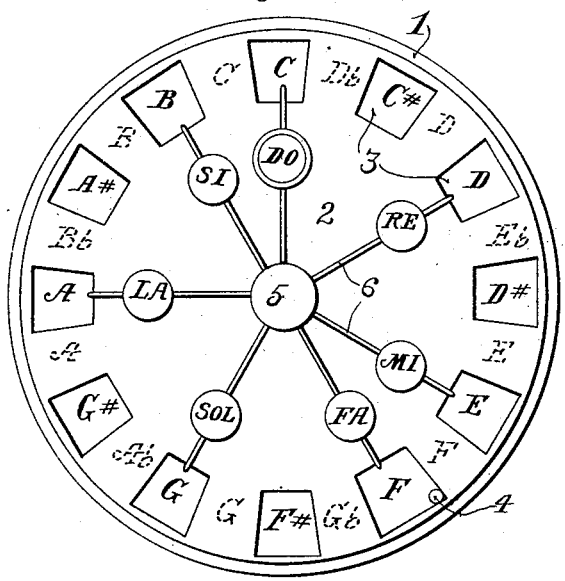
Figure 2:
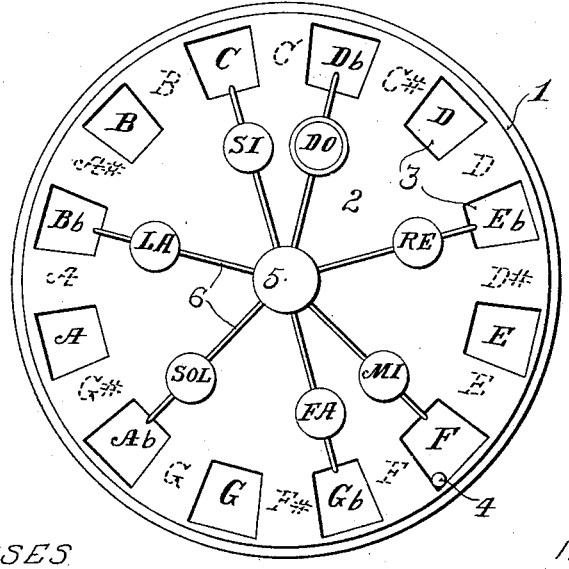

Figures 1 and 2 is a chart for illustrating the gamut with reference to the chromatic scale, Fig. 1 showing the chart adapted for use in such illustration where sharps are used and Fig. 2 where flats are used.

In music the chromatic scale is composed of thirteen tones, composed of eight scale-tones and five intermediate tones, and where the music is written in flats these intermediate tones are flatted, and where it is written in sharps these intermediate tones are sharped. The gamut is composed of six full tones and two half-tones, named "do, re, mi, fa, sol, la, si, do," and the position of these notes with reference to the chromatic scale changes in each different key. It is difficult for the pupil to quickly understand these different changes, and my chart is designed to ocularly demonstrate these changes and to show how they occur.

In the drawings, 1 indicates the base-board, of cardboard or other suitable material, preferably circular in form, near the outer edge of which is printed the letters representing the chromatic scale, arranged in a circle, both in sharps and flats. On this base, as thus arranged, is mounted a disk of cardboard 2 or other suitable material, in which are apertures 3, so arranged that all the letters representing the chromatic scale as applied to sharps shall appear through such apertures, while those relating to flats shall be hid from view, the same being shown in dotted lines in Fig. 1. Disk 2 has a limited rotary movement on base 1, so that the letters representing the chromatic scale as applied to flats may appear through the apertures, while those relating to sharps shall be hid from view, the same being shown in dotted lines in Fig. 2. The movement of the disk on the base is limited by stop-pin 4, affixed to the base and projecting through one of the apertures in the disk or by any other device for that purpose. In the center of the base and disk is revolubly mounted thumb-piece 5, to the shank of which are affixed seven fingers or pointers 6, spaced to correspond with the tones of the gamut, the fingers being consecutively marked with the names of the notes of the gamut. Now in illustrating the transposition of the gamut from the scale of C, in which the notes are all natural, to the scale of G, in which one of the notes is sharped, the instructor would take the chart and turn the disk as illustrated in Fig. 1 and by means of the thumb-piece would rotate the fingers to carry the finger marked "Do" so that it would point to G. The other fingers would then point as follows: "Re" to "A," "Mi" to "B," "Fa" to "C," "Sol" to "D," "La" to "E," and "Si" to "F♯," from which it is ocularly demonstrated that in the key of G there is one sharped note—to wit, F♯.

To illustrate the change to the key of "D," the fingers are rotated by thumb-piece so that "Do" points to "D," "Re" then points to "E," "Mi" to "F♯," "Fa" to "G," "Sol" to "A," "La" to "B," and "Si" to "C♯," from which it appears that in the key of "D" there are two sharped notes—to wit, "C♯" and "F♯." It will thus be seen that if the fingers are rotated so that the finger marked "Do" points to the keynote the fingers will immediately indicate what notes in such key are sharped or flatted.

Having described my invention, what I claim as new, and desire to secure by Letters Patent, is—

In a music-chart a base-board having the letters of the chromatic scale arranged in two sets thereon, alternately for flats and sharps; a disk having apertures, arranged to display the scale as arranged, either in sharps or flats mounted on said base; in combination with a thumb-piece revolubly mounted in said base and disk, having seven fingers spaced to accord with and having thereon respectively the names of the notes of the gamut.

In witness that I claim the foregoing I have hereunto subscribed my name, this 12th day of April, 1900, at Los Angeles, California.

CHARLES T. MEREDITH.

Witnesses:
G. C. HARPHAM,
ELMER HARPHAM.